(12) United States Patent
Nakashima et al.

(10) Patent No.: US 6,443,264 B2
(45) Date of Patent: Sep. 3, 2002

(54) STACKER CRANE

(75) Inventors: Shozou Nakashima, Nagoya; Tomoharu Matsumoto, Inuyama; Akira Kato, Kani, all of (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/978,023

(22) Filed: Oct. 17, 2001

Related U.S. Application Data

(62) Division of application No. 09/531,685, filed on Mar. 20, 2000.

(30) Foreign Application Priority Data

Jun. 10, 1999 (JP) .............................. 11-163396
Jun. 10, 1999 (JP) .............................. 11-163397

(51) Int. Cl.[7] ................................. B66B 9/00
(52) U.S. Cl. ...................... 187/249; 187/414; 104/121
(58) Field of Search ................ 414/277, 281, 414/282; 104/121; 187/406, 249, 414

(56) References Cited

U.S. PATENT DOCUMENTS

| | | | | |
|---|---|---|---|---|
| 3,424,322 A | * | 1/1969 | Saul ..................... 414/281 X |
| 3,661,280 A | * | 5/1972 | Atwater ................. 414/281 X |
| 3,792,785 A | * | 2/1974 | Weir ..................... 414/281 X |
| 4,265,582 A | * | 5/1981 | Theobald ............... 414/281 X |
| 5,641,041 A | * | 6/1997 | Masuda et al. ............ 187/347 |
| 5,749,693 A | * | 5/1998 | Hanaya ................. 414/281 X |
| 5,798,020 A | * | 8/1998 | Crucius et al. ......... 414/281 X |

FOREIGN PATENT DOCUMENTS

| | | |
|---|---|---|
| JP | 6-100109 | 4/1994 |
| JP | 6-25444 | 7/1994 |

* cited by examiner

*Primary Examiner*—Eileen D. Lillis
*Assistant Examiner*—Thuy V. Tran
(74) *Attorney, Agent, or Firm*—Armstrong, Westerman & Hattori, LLP

(57) ABSTRACT

An upper cart 12 and a lower cart 2 have running motors 4, 14, respectively, for controlling these carts in a manner overlapping each other on a vertical line. A mast 18 is formed into a truss structure, and an elevating platform 20 has a slide fork a load on which is supported on a shelf support of a rack. The present invention provides a light stacker crane operating at a high speed.

4 Claims, 8 Drawing Sheets

STACKER CRANE

This application is a division of prior application Ser. No. 09/531,685 filed Mar. 20, 2000.

FIELD OF THE INVENTION

The present invention relates to improvements of a stacker crane.

BACKGROUND OF THE INVENTION

In an automatic warehouse, a stacker crane is used as a transfer device wherein a cylindrical mast is provided on a lower cart so that an elevating platform can be elevated and lowered along the mast. Since the mast is rigid and is, for example, 30m in height, the mast is thus very heavy. Correspondingly, the stacker crane is heavy and operates at a low speed.

SUMMARY OF THE INVENTION

It is an object of the present invention to provide a light stacker crane capable of operating at a high speed.

It is an additional object of the present invention to reduce the weight of the mast to facilitate an increase in speed of the stacker crane.

It is an additional object of the present invention to reduce an unbalanced load on the mast to further reduce the weight.

It is an additional object of the present invention to allow the stacker crane to be smoothly driven at a high speed in order to improve the transfer capability of the stacker crane.

It is an additional object of the present invention to provide a specific mechanism for transmitting thrust to the mast.

It is an additional object of the invention to absorb vibration in the mast.

A stacker crane according to the present invention is characterized by having an upper cart provided at the top of a mast, a running motor and running wheels provided in each of a lower cart and the upper cart, and control means for controlling at least one of the running motors so that the upper and lower carts overlap each other on a vertical line.

Preferably, the upper and lower carts each have a position-recognizing means such as a laser range finder, and the control means is configured so as to allow the upper and lower carts to overlap each other on a vertical line by controlling the running motor for the cart running ahead, in a manner synchronizing with the running motor for the cart running behind.

In addition, preferably, the mast of the stacker crane is formed into a truss structure comprising a plurality of columnar members.

Further, preferably, the mast is slidably connected to at least one of the upper and lower carts.

In addition, preferably, the mast is elastically connected to the at least one of the carts.

Further, preferably, the mast is connected to the at least one of the carts via dampers.

According to the present invention, the lower cart is provided at the bottom of the mast, while the upper cart is provided at the top of the mast. The lower and upper carts each have the running motor and the running wheels so as to run by means of these components. The running motors are controlled so that the upper and lower carts overlap each other oil a vertical line. When the upper and lower carts overlap each other on a vertical line, the mast is subjected to no force acting in a horizontal direction of the stacker crane, so that the weight of the mast can be reduced. Then, the upper and lower carts are driven relative to this mast with a reduced weight, thereby increasing the speed of the stacker crane.

According to the present invention, the upper and lower carts are allowed to overlap each other on a vertical line by controlling the running motor for the cart running ahead, in a manner synchronizing with the running motor for the cart running behind. As a result, the upper and lower carts can be allowed to constantly overlap each other on a vertical line.

According to the present invention, the mast is formed into a truss structure, thereby reducing the weight of the mast and further increasing the speed of the stacker crane.

According to the present invention, since the mast is slidably connected to at least one of the upper and lower carts, control errors between the upper and lower carts are absorbed by sliding of the mast to prevent an excess force from being applied to a connection between each of the carts and the mast. The cart to which the mast is slidably connected applies a thrust to the mast depending on the amount of sliding. If, for example, the amount of sliding is zero, almost no force is applied to the mast to allow this cart to run by means of a thrust from the other cart. Consequently, the stacker crane can be run at a high speed, and the connection between the mast and the cart is prevented from being subjected to an excess force.

According to the present invention, since the mast is elastically connected to the one of the carts, an elastic force can be applied to the mast as a thrust, depending on the amount of sliding.

According to the present invention, the dampers serve to prevent the mast from vibrating and in particular to promptly end vibration of the mast when the stacker crane is stopped, thereby reducing the time required before a loading operation can be started.

DETAILED DESCRIPTION OF THE EMBODIMENT

Figure 1:
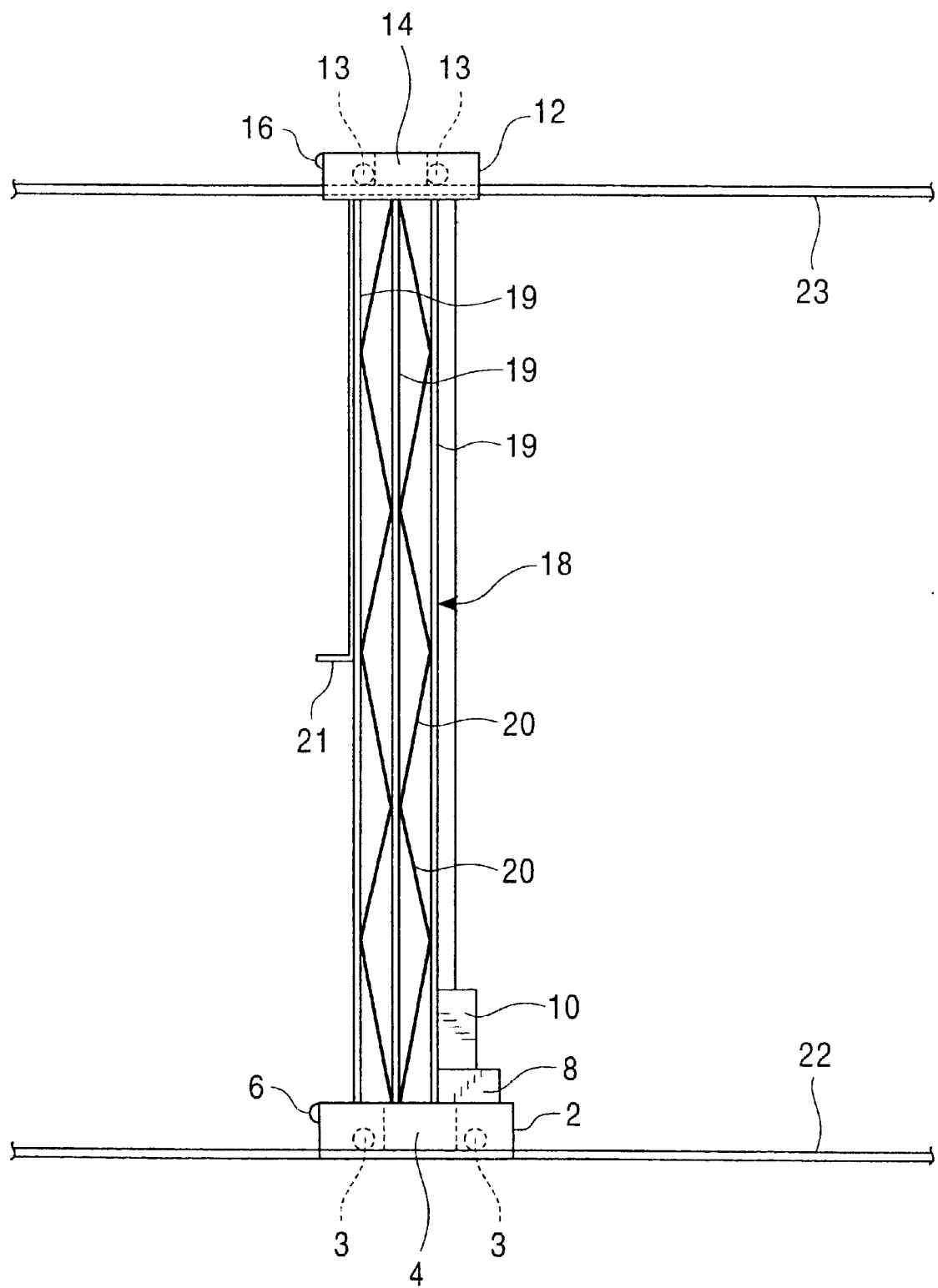
FIG. 1 is a side view of a stacker crane according to an embodiment of the present invention.
Figure 3:
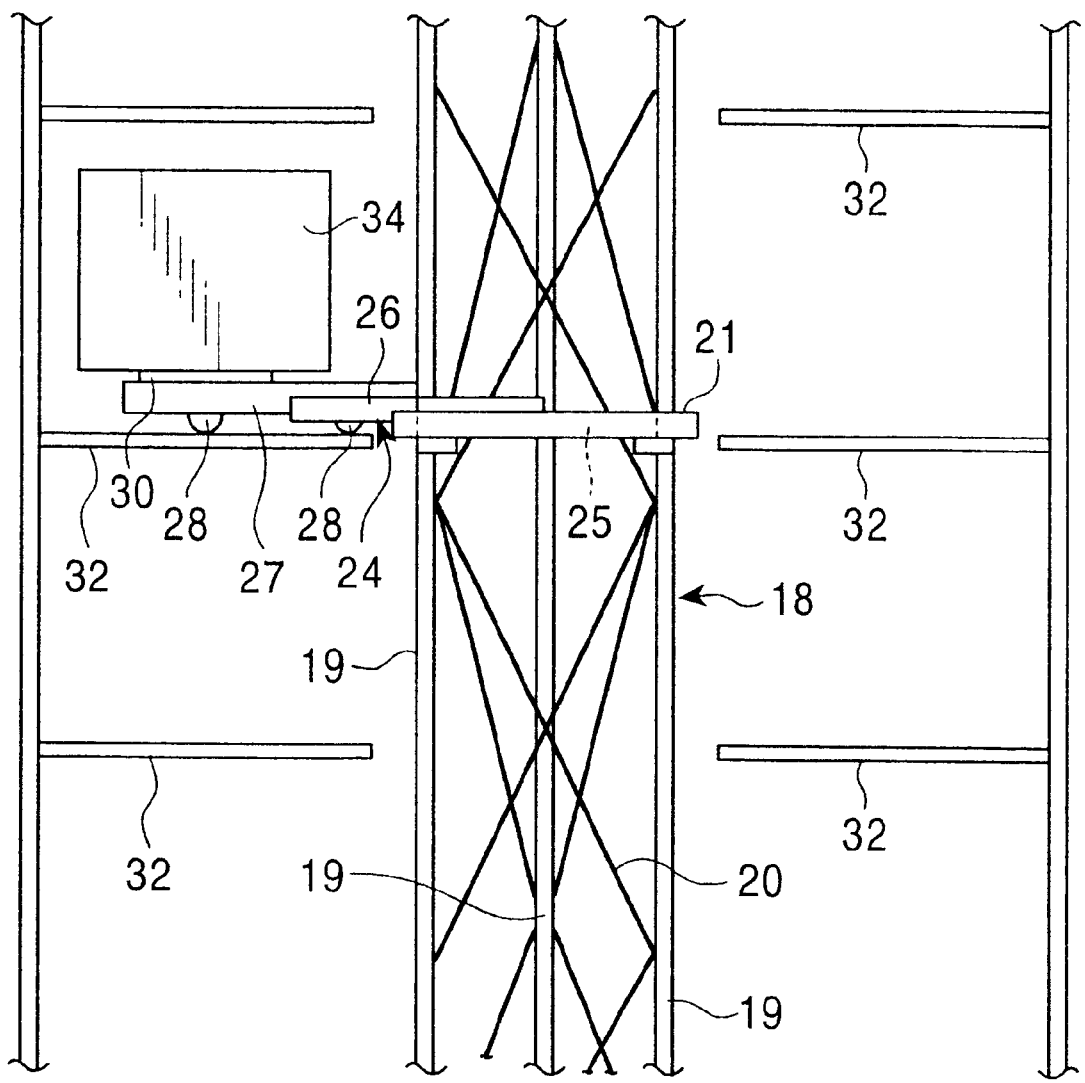
FIG. 3 shows how the elevating platform works in the stacker crane according to the present invention.
Figure 4:
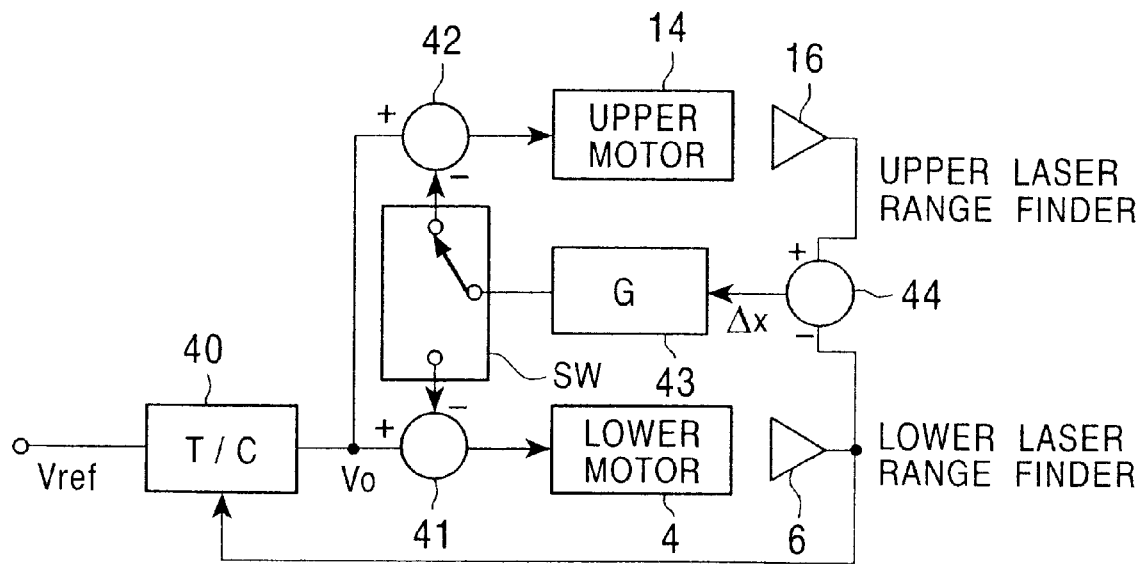
FIG. 4 is a block diagram showing how the upper and lower carts are controlled in the stacker crane according to the present invention.
Figure 5:
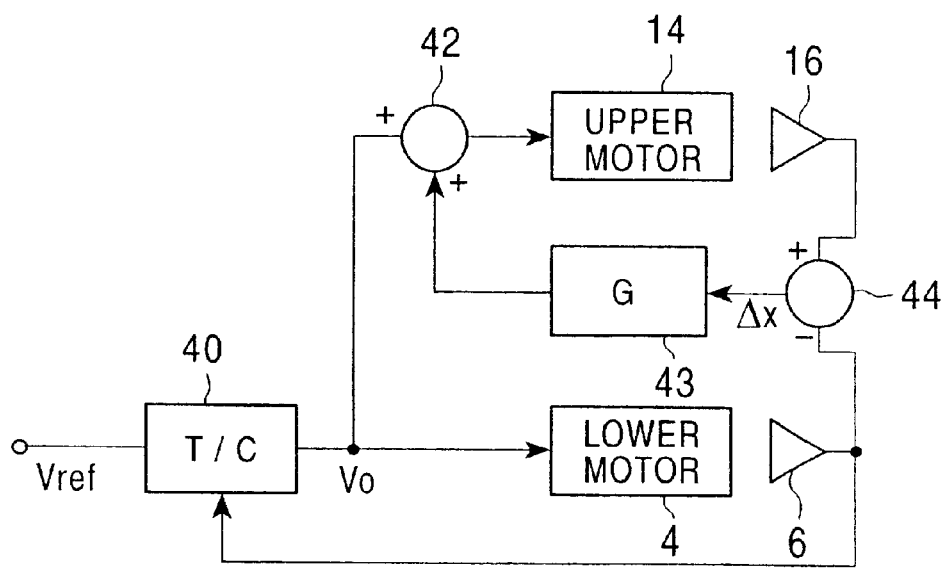
FIG. 5 is a block diagram showing a variant of control of the upper and lower carts according to the present invention.

FIGS. 1 to 4 show a stacker crane according to an embodiment of the present invention, and FIG. 5 shows a variant of control means for upper and lower running motors. Referring to FIG. 1, which shows the entire stacker crane, 2 is a lower carat, 3, 3 are running wheels, 4 is a lower running motor, and 6 is a laser range finder for determining the distance from an origin in an automatic warehouse. In addition, 8 is a common power supply for the entire stacker crane, and 10 is an elevation drive section. The stacker crane has an upper cart 12 at its top. 13, 13 are its running wheels, 14 is an upper running motor, and 16 is a laser range finder similar to the laser range finder 6. A mast 18 of a truss structure is provided between the upper cart 12 and the lower cart 2, and comprises three columnar members 19, 19, 19 connected together using braces 20. Although this embodiment uses the three columnar members 19, 19. 19, four such members may be provided. In addition, 21 is an elevating platform elevated and lowered by the elevation drive section 10 along the mast 18. 22 is a lower rail and 23 is an upper rail. The stacker crane is used, for example, for transferring articles in an automatic warehouse.

Figure 2:
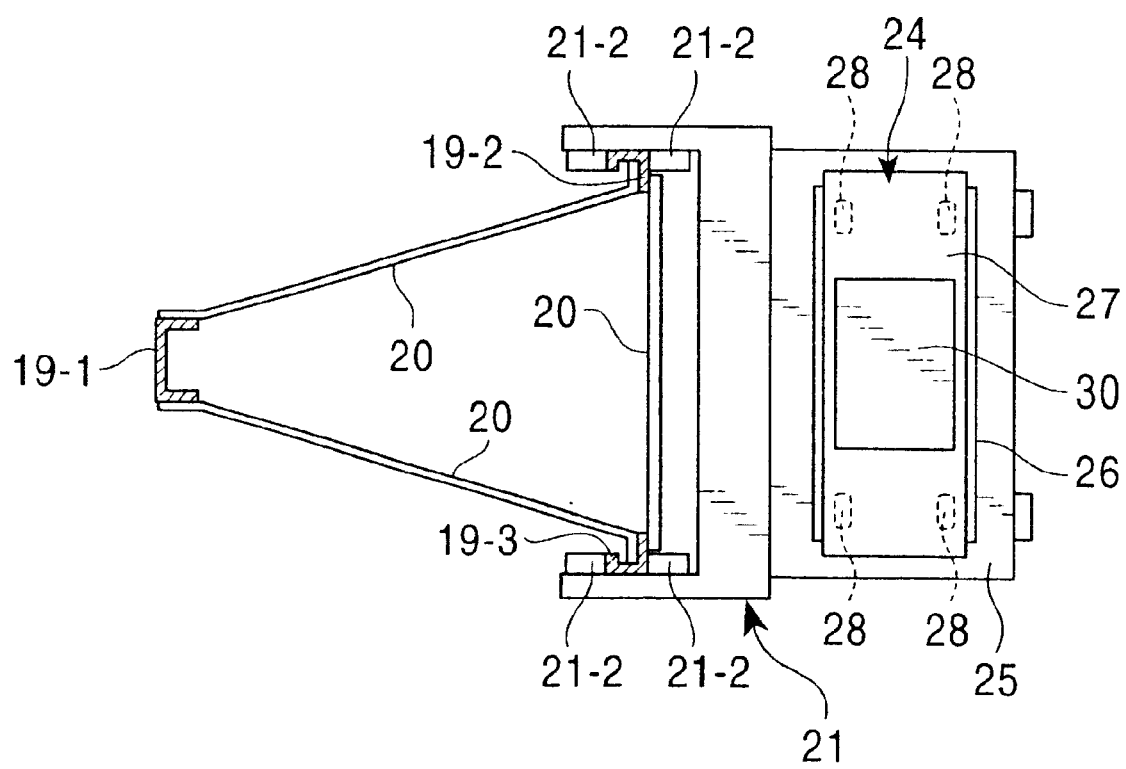
FIG. 2 shows how an elevating platform is attached to a mast according to the present invention.

FIGS. 2 and 3 show how the elevating platform 21 is attached to the mast 18 and also show a slide fork 24 provided on the elevating platform 21. The mast 18 is comprised of the columnar members 19-1 to 19-3, and the columnar members 19-2, 19-3 are also used as guide rails for guiding wheels 21-2 of the elevating platform 21 in such a manner that each of the columnar members 19-2, 14-3 is sandwiched between the wheels 21-2 from the outside thereof. The slide fork 24 mounted on the elevating platform 21 has three plates 25, 26, 27 constructed so as to slide in a lateral direction of the stacker crane via chains. 28, 28 are running rollers each provided on the tip plate 27 and may be wheels or balls, and 30 is a lifter provided on the tip plate 27. The lifter 30 eliminates the need to move the plate 27 in a vertical direction of the stacker crane in loading and unloading an article 34.

The slide fork 24 runs on a shelf support of a rack 32 using the rollers 28, 28 to load and unload the article 34 on and from a shelf on the rack by allowing the lifter 30 to elevate and lower the article 34. Thus, a load on the slide fork 24 is supported by the rack and is not applied to the elevating platform 21. Thus, an unbalanced load that may be applied to the mast 18 can be prevented to enable the weight of the mast 18 to be reduced. In addition, the lifter 30 located at the tip of the slide fork 24 is used for loading and unloading the article on and from the shelf on the rack, thereby eliminating the need to slightly move the elevating platform 21 in the vertical direction in loading and unloading the article. This construction can increase the speed at which articles are loaded and transferred.

According to the embodiment, the mast 18 is formed into a truss structure in order to reduce its weight. In addition, the use of the pair of upper and lower carts 12, 2 increases the speed at which 4 the stacker crane operates. The mast 18 extends in the vertical direction when the upper cart 12 and the lower cart 2 overlap each other on a vertical line; in other words, when no air resistance or inertia force is applied to the mast 18. As a result, a horizontal force applied to the mast 18 is minimized to enable the weight of the mast 18 to be further reduced. In this case, control means is correspondingly required for controlling the carts 2, 12 in synchronism.

FIG. 4 shows a control system for motors 4, 14. Numeral 40 is a control section having an output V0; 41, 42, 44 are differentiators; and 43 is an amplifying section for applying a control gain for an output $\Delta x$ (a positional value for the upper cart 12—a positional value for the lower cart 2) from the differentiator 44. Numerals 6 and 16 are each the above-mentioned laser range finder for determining the distance from an origin in a warehouse of the upper cart 12 and the lower cart 2, and SW is a switch for determining whether the upper or lower motor 14 or 4 is to be subjected to control for eliminating a positional unbalance between the upper cart 12 and the lower cart 2 (the unbalance means that $\Delta x$ is not 0). According to this embodiment, the motor for a cart running ahead is controlled to decelerate so as to synchronize with the motor for a cart running behind. This construction can prevent, in any case, the upper cart 12 and the lower cart 2 from being misaligned on a vertical line due to insufficient capacity of one of the motors, or for another reason.

In FIG. 4, Vref is a target speed value determined based on a running pattern stored beforehand, and V0 is a control value corresponding to the difference between the target speed value and a speed determined based on an actual position obtained, for example, by the lower laser range finder 6. Then, the differentiator 44 checks whether the upper cart 12 or the lower cart 2 is running ahead. If the upper cart is running ahead and $\Delta x$ is positive, the switch SW is connected to the differentiator 42 for control based on Equation (1)

$$V\text{up}=V0-Kp\cdot\Delta x-Ki\int\Delta x(\Delta x>0) \tag{1}$$

That is, control based on the control target value V0 is applied to the lower motor 4 regardless of the interrelationship with the upper motor 14, while the upper motor 14 is subjected to a control quantity Vup comprising proportional and integral control based on Equation (1) in order to eliminate the misalignment $\Delta x$. In the above equation, Kp and Ki are control constants. Consequently, the upper cart 12 is decelerated to allow the upper cart 12 and the lower cart 2 to overlap each other on a vertical line, whereby the mast 18 accurately aligns with the vertical axis.

On the contrary, if the lower cart 2 is running ahead, $\Delta x$ is negative and the switch SW is connected to the differentiator 41. The upper motor 14 is subjected to a control quantity V0, whereas the lower motor 4 is subjected to a control quantity Vdown comprising proportional and integral control for eliminating the error $\Delta x$ relative to the control quantity V0, as shown in Equation (2).

$$V\text{down}=V0+Kp\cdot\Delta x+Ki\int\Delta x(\Delta x<0) \tag{2}$$

In place of the control in FIG. 4, control may be applied so that the positional error $\Delta x$ between the upper cart 12 and the lower cart 2 is eliminated by the upper cart 12 side. This control is expressed by Equation (3) indicating that the lower motor 4 is controlled based on the difference between the target speed Vref and a speed determined based on a position obtained by the laser range finder 6. The upper motor 14 is subjected to the control quantity Vup comprising proportional and integral control for eliminating the positional error $\Delta x$ between the upper cart 12 and the lower cart 2. This method can also control the upper cart 12 and the lower cart 2 in a fashion overlapping each other on a vertical line. If, however, $\Delta x$ increases above the controllable range of the upper cart 12, for examples if the upper cart 12 cannot catch up with the lower cart 2 despite the rotation of the upper running motor 14 with its full power, then $\Delta x$ cannot be eliminated during running, thereby requiring the stacker crane to be stopped.

$$V_{up} = V_0 - K_p \cdot \Delta x - K_i \int \Delta x \quad (3)$$

Figure 6:
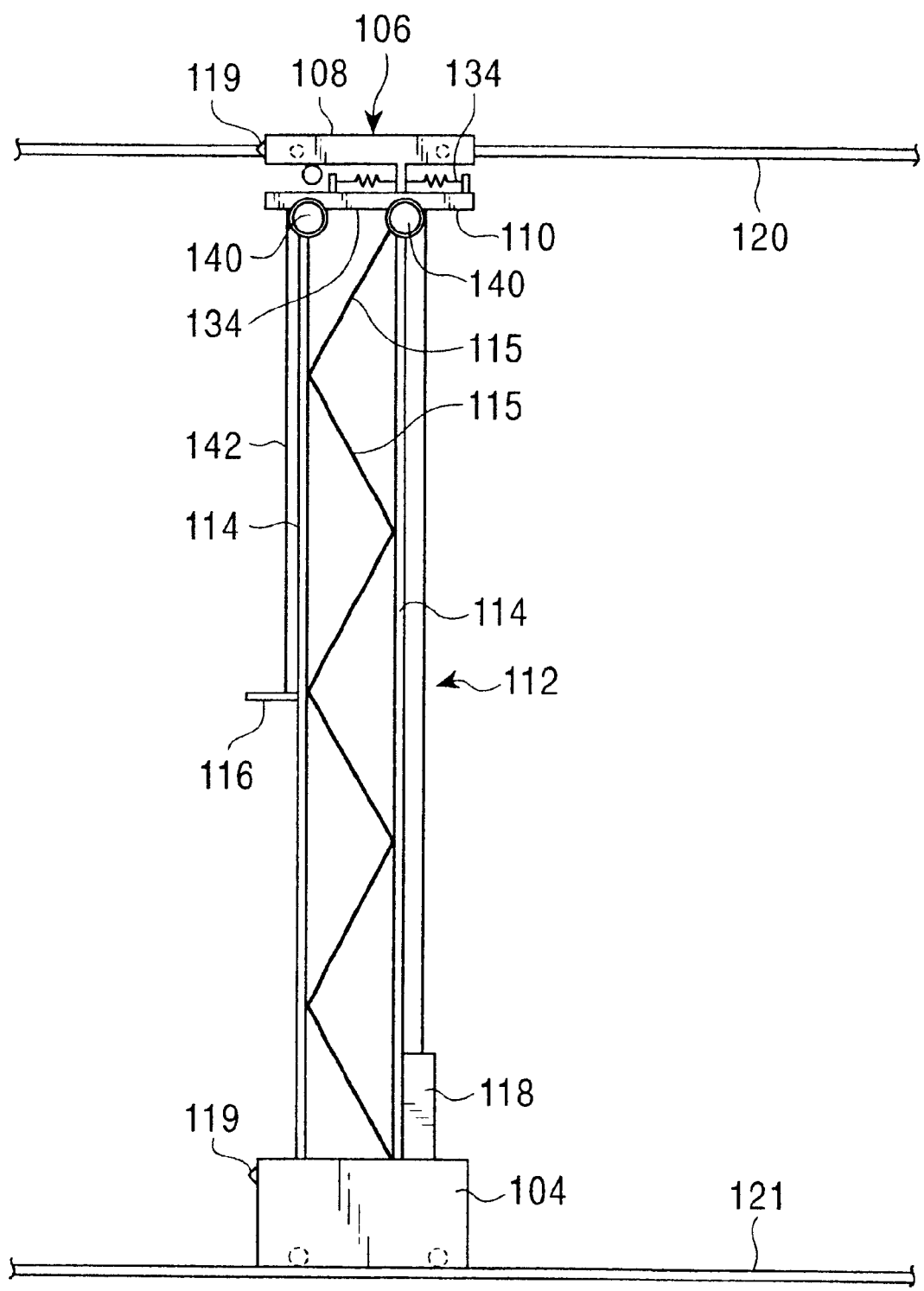
FIG. 6 is a side view of a stacker crane according to another embodiment of the present invention.
Figure 9:
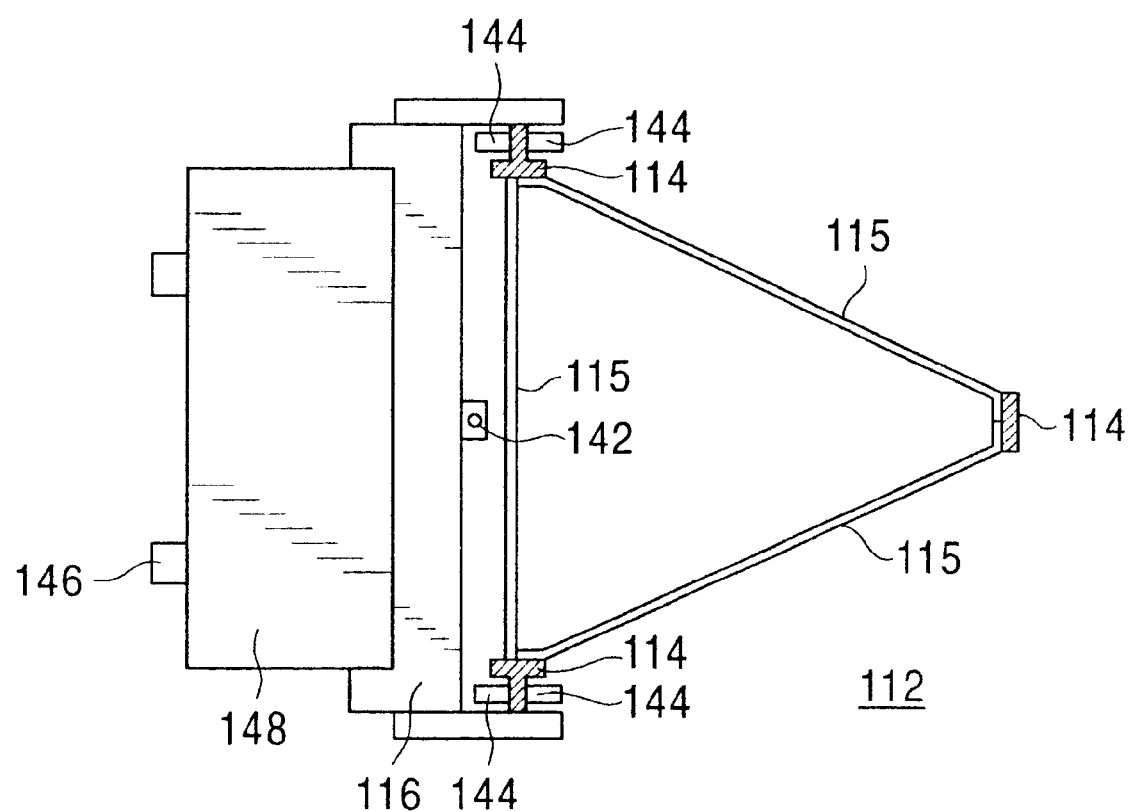
FIG. 9 shows how an elevating platform is attached to a mast according to the second embodiment of the present invention.
Figure 10:
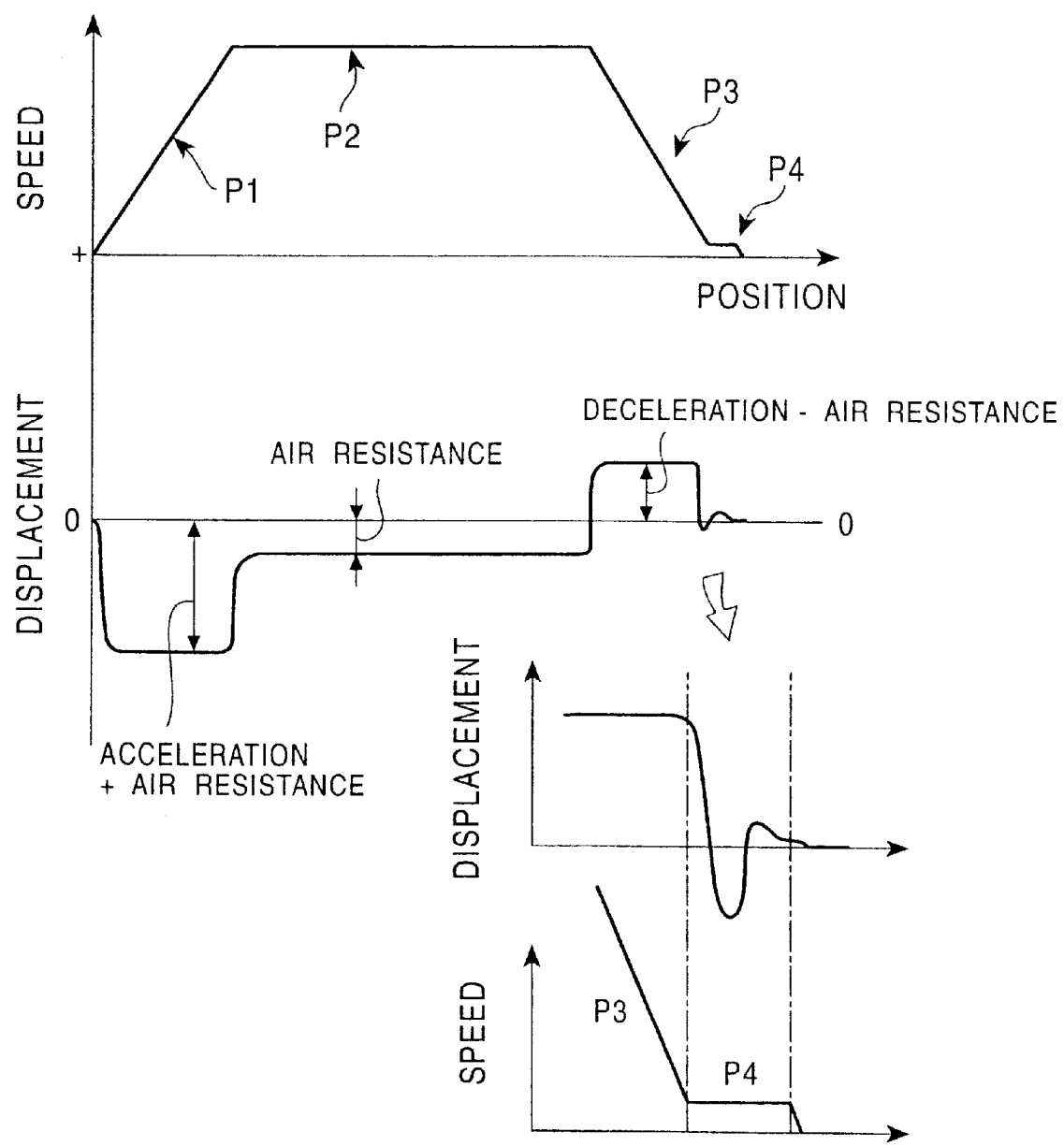
FIG. 10 is a characteristic diagram showing a running pattern of the stacker crane and displacements of the mast relative to the upper cart according to the second embodiment of the present invention.

FIGS. 6 to 9 show a stacker crane according to another embodiment, and FIG. 10 shows a running pattern of this stacker crane. Referring to FIG. 6, which shows the entire stacker crane, 104 is a lower cart, 106 is an upper cart, and the carts are each comprised of a running unit 108 and a connection unit 110 elastically connected thereto. 112 is a mast adapted to have a truss structure obtained, for example, by coupling three columnar members 114, 114, 114 together via braces 115. The mast 112 is, for example, 30 m in height and is fixed to the lower cart 104 and the connection unit 110. 116 is an elevating platform that elevates and lowers along the mast 112, and 118 is an elevation drive section. 119 is a laser range finder for detecting tile absolute positions of the carts 104, 116. 120 is an upper rail and 121 is a lower rail. The stacker crane is used, for example, for transferring articles in an automatic warehouse.

Figure 7:
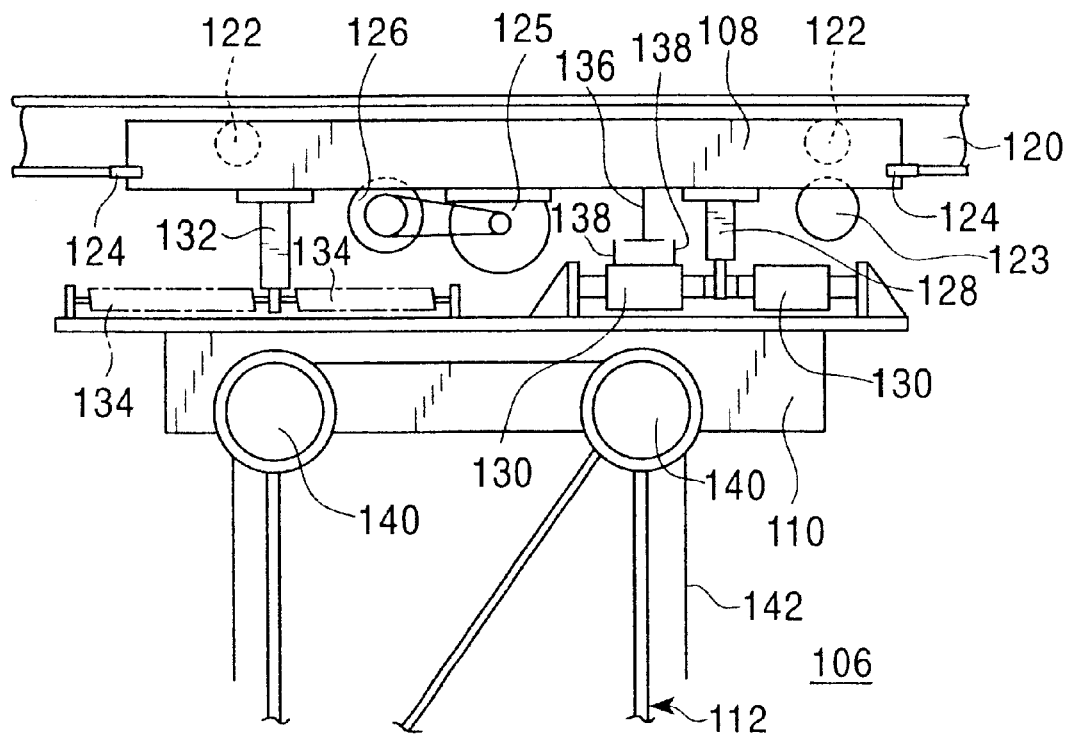
FIG. 7 is a side view showing an upper cart in the stacker crane according to the second embodiment of the present invention.
Figure 8:
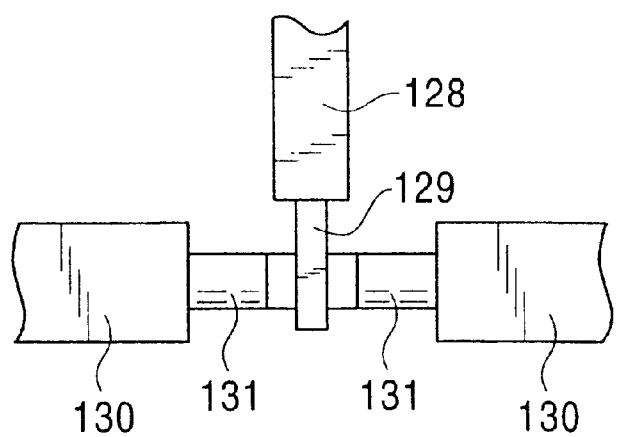
FIG. 8 shows a connection a between dampers and a running unit according to the second embodiment of the present invention.

FIG. 7 shows an elastic connection between the running unit 108 and the connection unit 110. The connection unit 110 has an upper end of the mast 112 secured thereto. The running unit 108 runs along the upper rail 120, and is elastically connected to the connection unit 110 to avoid an excess force that may be applied to the connection. The running unit 108 has guide rollers 122, 123, 124 provided thereon and guided by the upper rail 120, and is run when running wheels 126 are driven by a running motor 125. An arm 128 provided on the running unit 108 has, for example, a pair of dampers 130, 130 connected thereto and provided on the connection unit for preventing vibration of the mast 112. The dampers 130 are each composed of an electromagnetic or oil damper and have a bar-shaped member 131 located at a tip thereof abutting on a plate-like member 129 fixed to the arm 128 for vertical and lateral movements. This construction allows only the contact position between the bar-shaped member 131 and the plate-like member 129 to be moved despite deformation of the mast 112, for example, its deflection, thereby avoiding application of an excess force.

The running unit 108 has an arm 132 provided thereon and to which springs 134, 134 on the connection unit 110, for example, spring coils, laminate springs, or ring springs, are connected from opposite sides of the arm 132. Thus, a force applied from the running unit 108 to the connection unit 110 in the direction of the rail 120 a thrust acting in the running direction is applied depending on displacement of the springs 134. This thrust is not necessarily proportional to the displacement. If the springs 134, 134 have a high damping capability or undergo a large friction when displaced, they act as dampers to eliminate the need for the dampers 130, 130. On the contrary, if the dampers 130, 130 provide a spring capability at opposite ends of a stroke, then they serve to eliminate the need for the springs 134. Numeral 136 is a detection arm of the ruining unit 108, and 138, 138 are limit switches for detecting a position of the detection arm 136 and must only be capable of detecting that displacement between the running unit 108 and the connection unit 110 located below it corresponds to a predetermined value or greater. Numeral 140 is a sheave for a lifting wire 142 for the elevating platform FIG. 9 shows how the elevating platform 116 is attached to the mast 112. The mast 112 is comprised, for example, of the three columnar members 114, and two of these columnar members are also used as guide rails so that guide rollers 144 of the elevating platform 116 each elevate and lower in a manner sandwiching a corresponding one of the columnar members 114 from opposite sides thereof. A transfer means such as a slide fork 148 is mounted on a pallet 146 of the elevating platform 116.

According to this embodiment, the mast 112 is formed into a truss structure in order to reduce its weight. In addition, the use of the pair of the upper cart 106 and lower cart 104 increases the speed at which the stacker crane operates. Correspondingly, a relatively large force is applied between the connection unit 110 and the running unit 108, but is absorbed by the springs 134, 134, and vibration of the mast 112 is absorbed by the dampers 130, 130. On the contrary, the running unit 108 transmits a thrust to the connection unit 110 via the springs 134, 134, wherein the thrust is equal to inertia force or air resistance acting on an upper part of the mast 112.

FIG. 10 shows a speed pattern of the stacker crane and displacement of the springs 134, 134. Due to its small weight and large thrust, the stacker crane accelerates at an acceleration about five times as large as that in the prior art (area P1), runs at a speed about twice as that in the prior art (area P2), decelerates at a deceleration about five times as large as that in the prior art (area P3), and stops after running over a short distance at a low speed (area P4). Accordingly, if the connection unit 110 is secured to the running unit 108 so as to be prevented from displacement, a large force is applied between these units. In contrast, since the connection unit 110 is elastically connected to the running unit 108, these units are prevented from being subjected to an excess force. In addition, the dampers 130 prevent the mast 112 from vibrating associated with fast running or a high acceleration or deceleration.

In the area P1, a force required for accelerating the mast 112 and a thrust corresponding to air resistance are applied via the springs 134, in the area P2, the thrust corresponding to the air resistance is applied via the springs 134, in the area P3, a braking, force is applied corresponding to the difference between an inertia force associated with deceleration and the air resistance, and in the, area P4, an error in deceleration control is eliminated and vibration of the mast 112 is stopped, followed by stoppage at a target shelf. Thus, an excess force that may be applied to the upper cart 106 is avoided and the running time of the stacker crane is reduced to improve its transfer capability.

What is claimed is:

1. A stacker crane comprising a mast having an elevating platform and attached to a lower cart,
    wherein the stacker crane has an upper cart provided at the top of the mast, a running motor and running wheels provided in each of the lower and upper carts, and control means for controlling at least one of said running motors so that the upper and lower carts overlap each other on a vertical line, and
    wherein the mast is slidably connected to at least one of said upper and lower carts.

2. The stacker crane as recited in claim 1, wherein said mast is elastically connected to said one of the carts.

3. The stacker crane as recited in claim 1, wherein said mast is connected to said one of the carts via dampers.

4. A stacker crane as in claim 2, characterized in that said mast is connected to said one of the carts via dampers.

* * * * *